United States Patent [19]

Beers et al.

[11] Patent Number: 4,638,214
[45] Date of Patent: Jan. 20, 1987

[54] FLUORESCENT LAMP CONTAINING ALUMINATE PHOSPHOR

[75] Inventors: William W. Beers, Lyndhurst; Thomas G. Parham, Gates Mills, both of Ohio

[73] Assignee: General Electric Company, Schenectady, N.Y.

[21] Appl. No.: 854,272

[22] Filed: Apr. 21, 1986

Related U.S. Application Data

[62] Division of Ser. No. 715,858, Mar. 25, 1985.

[51] Int. Cl.$^4$ ............................................. H01J 61/44
[52] U.S. Cl. ..................................... 313/487; 313/486
[58] Field of Search ................................ 313/486, 487; 252/301.4 R, 301.4 P

[56] References Cited

U.S. PATENT DOCUMENTS

| 3,937,998 | 2/1976 | Verstegen et al. | 313/487 |
| 4,096,088 | 6/1978 | Ranby et al. | 252/301.4 R |
| 4,150,321 | 4/1979 | Schetters et al. | 313/486 |
| 4,305,019 | 12/1981 | Graff et al. | 313/487 |
| 4,335,330 | 6/1982 | Peters et al. | 313/486 |
| 4,447,756 | 5/1984 | Kohmoto et al. | 313/487 |

FOREIGN PATENT DOCUMENTS

| 152575 | 12/1981 | German Democratic Rep. | |
| 54-124581 | 9/1979 | Japan | 313/487 |
| 57-196470 | 12/1982 | Japan | 313/487 |

Primary Examiner—Jack Cooper
Attorney, Agent, or Firm—J. F. McDevitt; Philip L. Schlamp; Fred Jacob

[57] ABSTRACT

A class of non-stoichiometric class of cerium and terbium co-activated magnesium aluminate phosphors is disclosed which are particularly useful in low pressure type fluorescent lamps. Said phosphor materials can be further combined with other phosphors to produce white color illumination in said type lamps. A general method for preparation of said phosphor materials is disclosed wherein the emission characteristics can be regulated to advantage.

7 Claims, 1 Drawing Figure

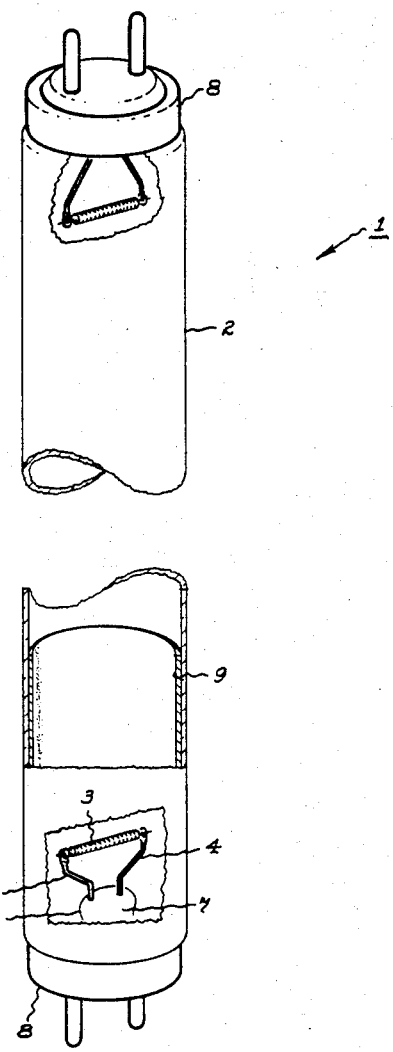

FLUORESCENT LAMP CONTAINING ALUMINATE PHOSPHOR

This is a division, of application Ser. No. 715,858, filed Mar. 25, 1985.

BACKGROUND OF THE INVENTION

This invention relates to a particular class of non-stoichiometric cerium and terbium co-activated magnesium aluminate phosphors which have been found particularly useful in fluorescent lamps. Already known stoichiometric phosphors of this type have the general formula:

$$Ce_{1-x-y}La_xTb_yMg\,Al_{11}O_{19}$$

wherein x is an optional constituent in an amount up to about 0.50, and y is in the range from about 0.20 up to about 0.50, and with said class of phosphors being described in Dutch patent application No. 7,214,862 and U.S. Pat. No. 3,937,998. In the conventional method of preparing said phosphor materials as further disclosed in U.S. Pat. No. 4,150,321, a mixed batch of ingredients which yields said phosphor material upon firing is prepared having the batch proportions of all metal ions as set forth in the aforementioned general formula and which batch is then fired at a temperature range between about 1550° C. up to 1700° C. in a reducing atmosphsphere, such as hydrogen. The batch mixture according to said prior art method of preparation may further contain solid fluxing agents such as boric acid or a metal borate in order to lower the reaction temperature of phosphor formation but which is also recognized to reduce the phosphor emission as compared to preparation without flux. In both of said method variations, moreover, the phosphor material is produced as a very hard mass requiring extensive milling to produce a free-flowing powder having a small enough particle size for most product applications, such as fluorescent lamps and the like. A second firing is often required after such milling in order to improve phosphor brightness sufficiently for acceptable product use.

A different preparation method for said stoichiometric aluminate phosphor material is disclosed in East German Patent No. 0152575 wherein a gaseous fluxing agent, namely hydrogen chloride, is employed to reduce the firing temperatures to 1200° C.-1350° C. and which produces a phosphor material requiring only minimal grinding to yield a free-flowing powder. According to said patent, the phosphor crystal size was said to depend upon the hydrogen chloride concentration with higher acid concentrations providing larger crystals. Said hydrogen chloride concentration was said to vary between about 0.5% and 100% by volume. On the other hand, phosphors prepared at the specified firing temperatures were found to have lower brightness than provided at higher firing temperatures.

Accordingly, it is a principal objective of the present invention to provide a class of said type phosphor materials exhibiting satisfactory brightness especially for lamp product applications and which can now be prepared in a more advantageous manner than the present commercial method of preparation.

Another important object of the present invention is to prepare a class of said phosphor materials which can be prepared by varying the method of preparation so as to produce desired variation in the phosphor emission characteristics.

Still another important object of the present invention is to prepare a class of said phosphor materials wherein desired variation of the phosphor emission characteristics does not substantially decrease phosphor brightness.

A still further important objective of the present invention is to provide improved fluorescent lamps utilizing the present phosphor materials.

SUMMARY OF THE INVENTION

It is now been discovered, surprisingly, that a non-stoichiometric class of cerium and terbium co-activated magnesium aluminate phosphors can be prepared having a minor deficiency in the magnesium ion content but which provide equivalent brightness when excited with 254 nanometers ultraviolet radiation as compared with the conventional stoichiometric phosphors. Moreover, said novel class of phosphor materials can be prepared having a median particle size range of about 5.0 microns diameter when formed to provide a materials saving in fluorescent lamps as compared with the larger particle size commercial phosphors of this type now being employed therein. Specifically, the present novel phosphor material comprises a plurality of fine-sized crystals having the general formula:

$$Ce_{1-x-y}La_xTb_yMg_zAl_{11}O_{19}$$

wherein
x is an optional constituent in an amount up to about 0.50
y is in the range from about 0.20 up to about 0.50, and
z is in the range from about 0.60 up to about 0.99,
said crystals having a median particle size range of about 5.0 microns diameter when formed, and being further characterized by a ratio between its 544 nanometers wavelength emission to its 490 nanometer wavelength emission of at least 5.0. Said defined phosphor emission characteristics provide dominant green emission in a relatively narrow wavelength band extending from about 520 nanometers wavelength up to about 565 nanometers wavelength and which has been found particularly useful in fluorescent lamp used for general illumination. To further explain, a phosphor of this general type serves as the green color emission component in a phosphor combination further including a blue color emission phosphor having an emission band in a wavelength region from about 430 nanometers wavelength up to about 490 nanometers wavelength and a red color emission phosphor having an emission band in a wavelength range from about 590 nanometers wavelength up to about 630 nanometers wavelength and with said phosphors being combined in proportions to produce white color light from said lamp at color temperatures of 7000°K, and below exhibiting both high efficiency and good color rendition. It is recognized in the aforementioned U.S. Pat. No. 3,937,998 that the ratio between green emission (544 nanometers wavelength) and the blue emission (490 nanometers wavelength) emission in said green color emission phosphor material also determines its useability since too low a ratio precludes desired white color points in the lamp emission from being achieved. On the other hand, it is also recognized by others that having only relatively narrow band emission phosphor components in this particular type lamp can reduce lamp color rendition. Accordingly, it can prove desirable with said phosphor material to have flexible control over the specified emission ratio so long as such variation does not produce significant lumen loss from the fluorescent lamp.

Basically, the present method of phosphor preparation comprises (1) mixing a batch of ingredients which will yield said phosphor material upon firing wherein the batch proportions of all metal ions are as set forth in the aforementioned general formula, and (2) firing the batch at a temperature range from about 1400° C. up to about 1600° C. for a time period up to about 4 hours in a reducing atmosphere containing hydrogen chloride. While all the particularly reactions taking place in said phosphor preparation have not yet been fully investigated, it has been discovered that control over the emission characteristics of the phosphor can be exercised in said method by variation in the process conditions. First of all, limiting hydrogen chloride content in a reducing atmosphere during said firing step to a maximum 5% by volume is desirable since higher hydrogen chloride concentrations have been found to produce excessive magnesium ion loss which is accompanied by phosphor brightness loss. On the other hand, lower firing temperatures in the above specified firing temperature range increases the 544/490 nanometers emission ratio without decreasing the phosphor brightness, whereas, shorter firing time periods increases phosphor brightness without reducing said phosphor emission ratio. It becomes thereby possible to vary both firing temperature range and time period in the present phosphor preparation method to produce variation said phosphor emission ratio, if desired, without decreasing the phosphor brightness. It has further been discovered that varying the temperature at which hydrogen choride is introduced into the reducing atmosphere during the firing step can significantly minimize the formation of secondary phases in said phosphor which can also reduce the brightness. For example, the introduction of hydrogen chloride into said furnace reducing atmosphere when the firing step is first begun and continuing said introduction throughout the specified time and temperature schedule produces undesirable alumina formation in the phosphor while limiting said hydrogen chloride introduction during the firing step to only when the phosphor temperature has reached 1200° C. produces no alumina formation.

A representative fluorescent lamp of the present invention comprises a sealed envelope enclosing means to generate a mercury discharge within said envelope to convert a major portion of the ultraviolet radiation emitted from said discharge to visible light of various colors. In the preferred embodiments, said mercury discharge is a conventional low pressure discharge and the phosphor coating can be either a single phosphor having the above-defined composition or a phosphor combination which includes said phosphor composition. To obtain various white color points in said fluorescent lamp employing the above specified red, blue and green color emission phosphor components, said phosphors can be generally mixed together in the conventional manner utilizing proportions to produce the desired white color point from said lamp. For example, a cool-white color point can be provided in said lamp when said phosphor mixture contains about 34 up to about 48 parts by weight of said green color emission phosphor, about 6 up to about 17 parts by weight of said blue color emission phosphor, and about 40 up to about 60 parts by weight of said red color emission phosphor and with a green color emission phosphor according to the present invention exhibiting trichromatic coordinates of approximately X=0.320 and Y=0.540 when excited by 254 nanometers ultraviolet radiation. A representative red color emission phosphor in said phosphor combination is trivalent europium activated yttrium oxide phosphor whereas a representative blue color emission phosphor for use in said combination can be either divalent europium activated barium magnesium aluminate phosphor or divalent europium activated strontium chloroapatite phosphor. It is still further contemplated that said improved phosphor combination being herein employed to produce white color light in low pressure type fluorescent lamps can be deposited as a top layer overlaying a phosphor layer of one or more less expensive phosphors as a means of decreasing the overall cost of the phosphor coating. More particularly, it is already known in the prior art to utilize a haloapatite phosphor which itself emits white light as said base layer and to deposit thereon a lesser coating weight of a blend comprising the more expensive narrow emission band phosphor materials above disclosed.

BRIEF DESCRIPTION OF THE DRAWING

In the accompanying drawing, there is shown a perspective view partially broken away of a low pressure mercury discharge fluorescent lamp construction utilizing a phosphor coating in accordance with the present invention.

DESCRIPTION OF THE PREFERRED EMBODIMENTS

Referring to the accompanying drawing, there is depicted a representative fluorescent lamp 1 comprising an elongated soda-lime silicate glass envelope 2 having a circular cross section. The low pressure mercury discharge assembly in said lamp includes a conventional electrode structure 3 at each end connected to in-lead wires 4 and 5 which extend through a glass press seal 6 in a mount stem 7 to the electrical contacts of a base 8 fixed at both ends of the sealed glass envelope. The discharge-sustaining filling in the sealed glass envelope is an inert gas such as argon or a mixture of argon and other rare gases at a low pressure in combination with a small quantity of mercury to provide the low vapor pressure manner of lamp operation. The inner surface of the glass bulb is provided with a phosphor coating 9 which includes the improved non-stoichiometric aluminate phosphor material according to the present invention. As a specific embodiment further describing said improved phosphor material, a number of fluorescent lamps having the known 40T12 construction at a nominal 40 watt rating were built and tested having various coating weights of said phosphor material and found to produce green color emission having trichromatic coordinates which ranged in X values from 0.3190 to 0.3202 and Y values ranging from 0.5377 to 0.5402.

In a preferred lamp construction of the above-described type, various 40T12 fluorescent lamps were built and tested wherein the phosphor coating consisted of a blend of from about 34 up to about 48 parts by weight of the present green color emission phosphor, about 6 up to about 17 parts by weight of a divalent europium activated barium magnesium aluminate phosphor, and about 40 up to about 60 by weight of trivalent europium activated yttrium oxide phosphor to provide cool, white color illumination at a 4100° K. color point.

Whereas a conventional blend of prior art phosphors providing the same color point utilizes approximately 41% by weight of the green color emission phosphor, approximately 11% by weight of the blue color emission phosphor and about 48% by weight of the red color emission phosphor, the relatively finer particle size of the presently improved green color emission phosphor can provide said color point at proportions of 38% by weight green color phosphor, 12% by weight of the blue color phosphor, and 50% by weight of the red color phosphor. Understandably, for lamp color points other than 4100° K. there would be different weight proportions for the individual phosphor constituents. The particular green color phosphor constituent according to the present invention which was employed in said test lamps was found to have the following general formula:

$$Ce_{0.65}Tb_{0.35}Mg_{0.75}Al_{11}O_{19}$$

in which said phosphor crystals have a median particle size range of about 5.0 microns diameter along with an emission characteristic between its 544 nanometers wavelength emission to its 490 nanometers wavelength emission of approximately 5.6.

To still further illustrate typical preparation of specific improved phosphors according to the present invention there is provided a number of examples in Table I below wherein the magnesium ion content in said phosphor has been varied in accordance with the present invention to produce a variation in the phosphor emission characteristic between its 544 nanometers wavelength emission and its 490 nanometers wavelength emission.

TABLE I

| Example | Mg Content (Mole Mg/Mole Phosphor) | Emission Rates (544/490 Peak Heights) |
|---|---|---|
| 1 | 0.55 | 7.5 |
| 2 | 0.64 | 6.6 |
| 3 | 0.70 | 5.5 |
| 4 | 0.75 | 5.6 |
| 5 | 0.87 | 5.0 |
| 6 | 0.89 | 4.8 |
| Control | 1.0 | 3.9 |

As can be noted from the above test results, the desired emission ratio characteristic of at least 5.0 was not reached until the magnesium ion deficiency exceeded 0.11 mole per mole of the phosphor. A tendency has been experienced with higher magnesium ion levels to increase the phosphor emission at both 490 and 585 nanometer wavelengths with a corresponding decrease in the 544 nanometer wavelength emission. As has been previously indicated, phosphors prepared in accordance with the present invention exhibit variation in the above reported emission ratio characteristic depending upon the particular firing conditions are employed. More particularly, said emission ratio characteristic has been found to increase from 6.0 at a 1600° C. firing temperature to about 8.5 at a 1315° C. firing temperature. On the other hand, reducing the firing temperature below about 1400° C. has been found to decrease the 544 nanometer wavelength emission and which undesirably reduces phosphor brightness in the desired limited 525 to 560 nanometer spectral region of particular interest.

A still further specific example is given below illustrating typical preparation for a non-stoichiometric phosphor material according to the present invention. A batch consisting of 0.715 mole $Al_2O_3$, 0.130 mole MgO, 0.085 mole $Ce(OH)_3$, and 0.011 mole $Tb_4O_7$ was prepared as a blended mixture in the conventional manner and thereupon fired in an alumina muffle furnace under reducing atmospheric conditions at a predetermined heating schedule. The particular reducing conditions employed consisted of approximately 5 standard cubic feet per minute of HCl which had been mixed with approximately 500 standard cubic feet per minute of forming gas and then introduced into the muffle furnace. The particular heating rate employed consisted of a heat-up rate of approximately 250° C. per hour with a holding time at the firing temperature selected between approximately one half hour to four hours and followed by a cool-down rate of approximately 200° C. per hour. The non-stoichiometric phosphor prepared in this manner was found to have the general formula:

$$Ce_{0.65}Tb_{0.35}Mg_{0.75}Al_{11}O_{19}$$

which when utilized as a coating in the above-described type low pressure fluorecent lamp produced a green color point having trichromatic coordinates of approximately X=0.3201 and Y=0.5400.

It will be apparent from the foregoing description that while specific examples have been provided on the phosphors, lamps and method used in the practice of the present invention, that various modifications thereof can be made within the spirit and scope of the present invention. For example, the proportions of phosphor constituents in a given phosphor blend will vary other than above specified if different lamp color points are desired. Additionally, it is further contemplated to introduce various non-phosphor constituents in the presently improved phosphor coatings for various fluorescent lamp applications in order to still further improve desired characteristics such as lumen depreciation. It is intended to limit the present invention, therefor only by the scope of the following claims:

What we claim as new and desire to secure by Letters Patent of the United States is:

1. A fluorescent lamp having a sealed envelope enclosing means to generate a low-pressure mercury discharge within said envelope and a phosphor coating to convert at least a portion of the radiation emitted from said discharge to visible light, wherein said phosphor coating includes a phosphor comprising a plurality of fine-sized crystals having the general formula:

$$Ce_{1-x-y}La_xTb_yMg_zAl_{11}O_{19}$$

wherein
La is an optional constituent and x is in an amount up to about 0.50,
y is in the range from about 0.20 up to about 0.50, and
z is in the range from about 0.60 up to about 0.87,
said crystals having a median particle size of about 5.0 micron, and being further characterized by a ratio between its 544 nanometers wavelength peak emission to its 490 nanometers wavelength peak emission of at least 5.0 along with exhibiting trichromatic coordinate values in the range X=0.3190–0.3202 and Y=0.5377–0.5402.

2. A fluorescent lamp as in claim 1 wherein said phosphor has its principal visible emission in the wavelength range from about 520 nanometers wavelength up to about 565 nanometers wavelength.

3. A fluorescent lamp as in claim 1 wherein the phosphor coating further includes a blue color emission phosphor having an emission band in the wavelength range from about 430 nanometers wavelength up to about 490 nanometers wavelength and a red color emission phosphor having an emission band in the wavelength range from about 590 nanometers wavelength up to about 630 nanometers wavelength and with said phosphors being combined in proportions to produce white color light from said lamp.

4. A fluorescent lamp having a sealed envelope enclosing means to generate a low-pressure mercury discharge within said envelope and a phosphor coating to convert at least a portion of the radiation emitted from said discharge to visible light, wherein said phosphor coating comprises the combination of a blue color emission phosphor having an emission band in the wavelength range from about 430 nanometers wavelength up to about 490 nanometers, a red color emission phosphor having an emission band in the wavelength range from about 590 nanometers wavelength up to about 630 nanometers wavelength, and a green color emission phosphor having principal visible emission in the wavelength range from about 520 nanometers wavelength up to about 565 nanometers wavelength, said green color emission phosphor comprising a plurality of fine-sized crystals having the general formula:

$$Ce_{1-x-y}La_xTb_yMg_xAl_{11}O_{19}$$

wherein
- La is an optional constituent and x is in an amount up to about 0.50,
- y is in the range from about 0.20 up to about 0.50, and
- z is in the range from about 0.60 up to about 0.87, said crystals having a median particle size of about 5.0 microns diameter, and being further characterized by a ratio between its 544 nanometers wavelength peak emission to its 490 nanometers wavelength peak emission of at least 5.0 along with exhibiting trichromatic coordinate values in the range X=0.3190–0.3202 and Y=0.5377–0.5402, and with said phosphor combination containing about 34 up to about 48 parts by weight of said green color emission phosphor about 6 up to about 17 parts by weight of said blue color emission phosphor, and about 40 up to about 60 parts by weight of said red color emission phosphor to produce visible light of a white color.

5. A fluorescent lamp as in claim 4 wherein said red color emission phosphor is trivalent europium activated yttrium oxide phosphor.

6. A fluorescent lamp as in claim 4 wherein said blue color emission phosphor is divalent europium activated barium magnesium aluminate phosphor.

7. A fluorescent lamp as in claim 4 wherein said blue color emission phosphor is divalent europium activated strontium chloroapatite phosphor.

* * * * *